Nov. 1, 1960

D. S. CHISHOLM ET AL 2,958,099

EXTRUSION DIE FOR PLASTIC EXTRUDERS

Filed Jan. 15, 1959

INVENTORS.
Douglas S. Chisholm
BY Harold R. Bylsma

Griswold & Burdick
ATTORNEYS

Nov. 1, 1960   D. S. CHISHOLM ET AL   2,958,099
EXTRUSION DIE FOR PLASTIC EXTRUDERS
Filed Jan. 15, 1959   2 Sheets-Sheet 2
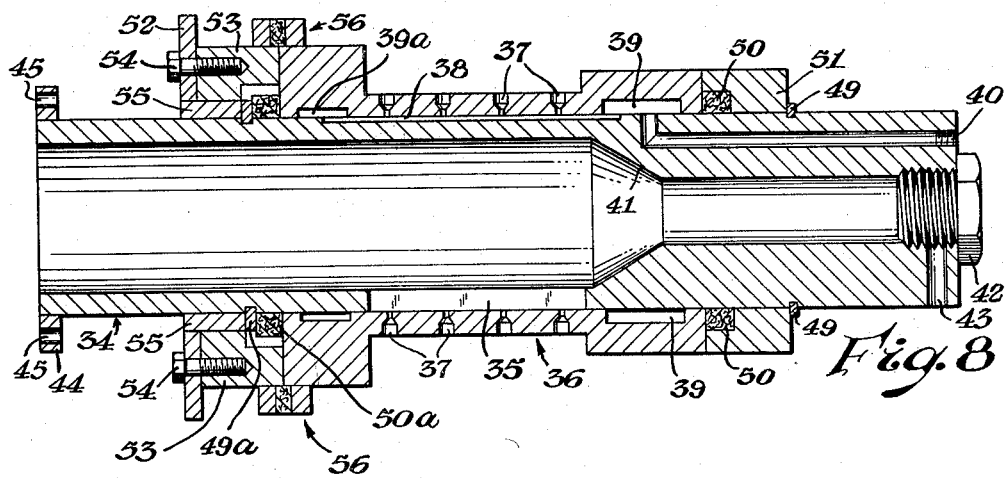
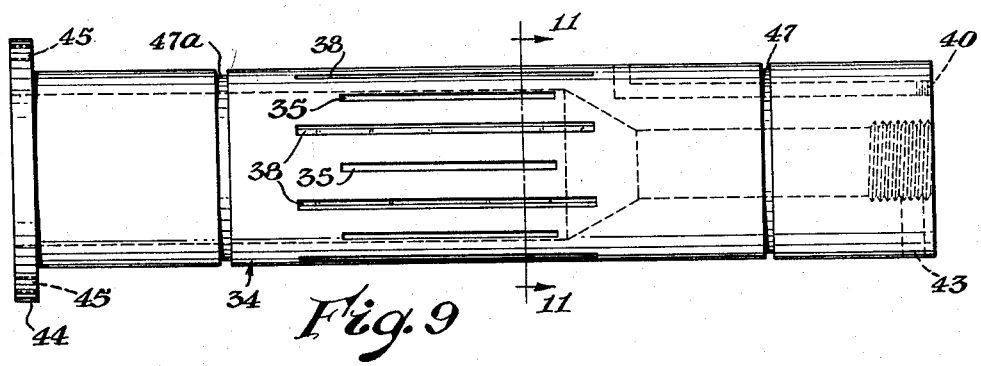
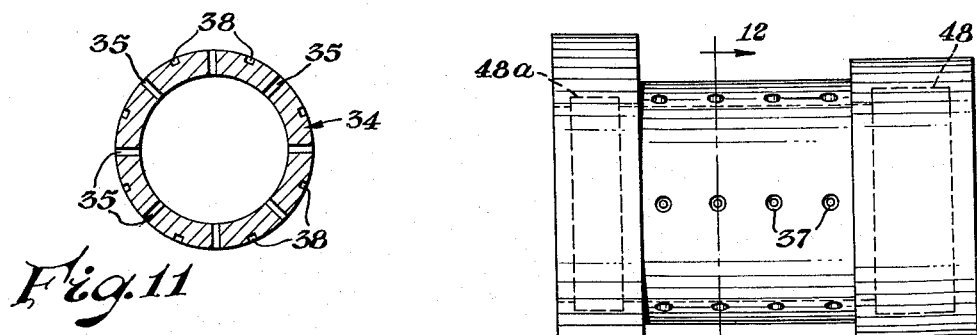
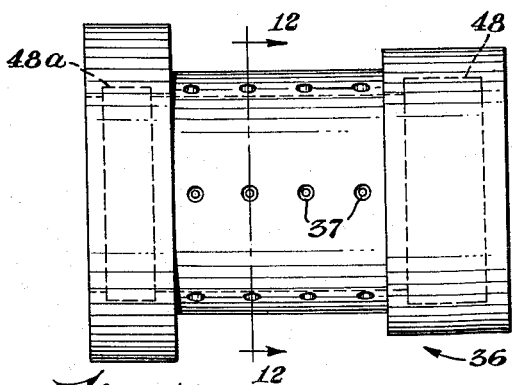
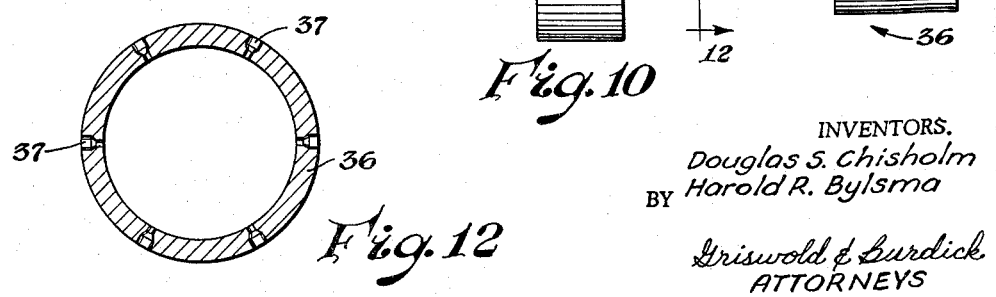
INVENTORS.
Douglas S. Chisholm
BY Harold R. Bylsma
Griswold & Burdick
ATTORNEYS 2,958,099
Patented Nov. 1, 1960

United States Patent Office

2,958,099

EXTRUSION DIE FOR PLASTIC EXTRUDERS

Douglas S. Chisholm and Harold R. Bylsma, Midland, Mich., assignors to The Dow Chemical Company, Midland, Mich., a corporation of Delaware Filed Jan. 15, 1959, Ser. No. 787,073

3 Claims. (Cl. 18—12)

This invention relates to an improved extrusion die for plastic extrusion machines and particularly to an intermittent extruding device for use in such extruders to produce molding granules in the form of beads.

Various means have been used to make molding granules from thermoplastic substances such as organic polymers, e.g. by grinding or crushing, or by extruding the heat-plastified polymer as a web, band, sheet or a plurality of strands which is cooled and cut or broken to a granular form suitable for molding.

The means heretofore employed for making granular particles of thermoplastic resins have the disadvantage that often the sizes of the particles range from fine dust-like powder to coarse granules and usually requires that the crushed or broken polymer be screened to obtain granules of substantially the same sizes suitable for molding. Even when the heat-plastified polymer is extruded as a web or a plurality of strands, then is cooled and cut or broken to a granular form, the granules are of irregular shapes and sizes and are less suitable for molding purposes than is desired. The use of irregular shaped granules or a mixture of such granules of substantially different sizes increases the difficulties of maintaining a uniform feed of the granules to injection molding machines or to plastics extrusion machines and causes variations in the molded articles.

It is accordingly among the objects of the present invention to provide a means, operable in conjunction with an extrusion machine for the intermittent extruding of a plastic feed as a plurality of globules and alternately cooling and ejecting the plastic to form solid beads of molding granules of substantially uniform size. Another object is to provide a novel and efficient extrusion die which can readily be adapted for use in standard extrusion apparatus. Still another object is to provide a novel extrusion die comprising in combination a die member and a discharging member and a novel valving means for intermittently extruding globules of a plastic material and alternately flowing a fluid through said discharging member. Further objects may appear as the description of the invention proceeds.

The foregoing and related objects have now been attained through the provision of an extrusion die comprising in combination a die member having a plurality of constricted passageways therethrough and a discharging member having a plurality of outlets, said die member and said discharging member being rotatable with respect to one another, with running clearance therebetween, and adapted to bring said constricted passageways in the die member in register with said outlets in the discharging member, said die member having in its surface adjacent to the discharging member a plurality of grooves, between and not connecting with the constricted passageways, which grooves are adapted to be brought in register with the outlets in said discharging member as said die member and said discharging member rotate with respect to one another, and means for feeding a fluid into said grooves in said die member.

An embodiment of the invention adapted to be employed in connection with a standard plastics extrusion machine is the provision of a simple elongated cylindrical die member adapted to be fitted coaxially to the forward end of a worm of an extruder, rotatable within the cylindrical barrel of the extruder and adjacent to a discharging member having a plurality of outlets, which in this case constitutes the discharging head at the end of the barrel of the extrusion machine. The die member is provided with a plurality of constricted passageways such as drill holes or slots, preferably peripheral slots, therethrough, and on its surface adjacent to the discharging member having a plurality of radially disposed grooves spaced and extending between the constricted passageways, but not to the periphery of the die member, and not connecting with the constricted passageways, which grooves are brought in register with the outlets in the discharging member as the die member is rotated with respect to the discharge member. The grooves in the face of the die member connect to a common chamber which can be an annular groove or axial depression in the die member and means are provided for feeding a fluid into said chamber. The combination of the rotatable die member having a plurality of constricted passageways, e.g. peripheral slots, therethrough, together with the grooves, between and not connecting with the constricted passageways, on the surface of the die member adjacent to the surface of the discharging member having outlets which are brought in register with said constricted passageways and grooves, and which grooves are connected with a common chamber having an inlet for feed of a fluid thereto, which inlet to said common chamber may include passage of the fluid through the running clearance between the die member and the discharging member as the die member is rotated, produces in practice of the invention a novel valving means which results in the intermittent extruding of a heat-softened thermoplastic substance as discrete globules through the constricted passageways in the die member into the outlets in the discharge member, and alternately the flow of a non-reacting fluid which is immiscible with the plastic substance through the grooves in the die member into the outlets in the discharge member, behind and into contact with the globules, to cool and eject the globules of the plastic substance from the outlets as solid beads, as the die member and the discharge member are rotated with respect to one another, whereby the constricted passageways and the grooves in the die member are alternately brought in register with the outlets in the discharge member.

The invention will be illustrated with reference to the accompanying drawings wherein:

Fig. 8 is a longitudinal section through another arrangement of a die member and a discharge member coaxial with and rotatable in relation to one another comprising the new extrusion die of the invention, and adapted to be used in combination with a standard plastics extruder as an extension of the barrel of the extruder.

Fig. 9 is a side view of the die member in elevation shown in Fig. 8.

Fig. 10 is a side view of the discharge member in elevation shown in Fig. 8.

Fig. 11 is a cross-sectional view of the die member taken along the lines 11—11 of Fig. 9.

Fig. 12 is a cross-sectional view of the discharge member taken along the lines 12—12 of Fig. 10.

Figure 1:
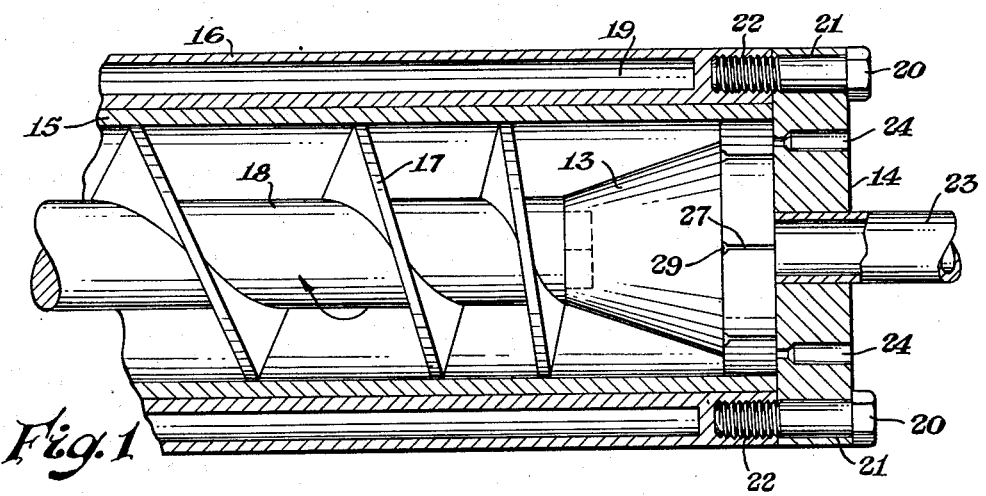
Fig. 1 is a longitudinal section through part of the barrel of a standard plastics extruder showing a feed worm and the new extrusion die comprising the die member and the discharging member in elevation.
Figure 3:
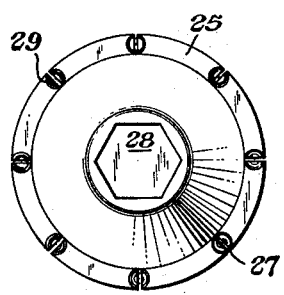
Fig. 3 is an end view of the die member.
Figure 2:
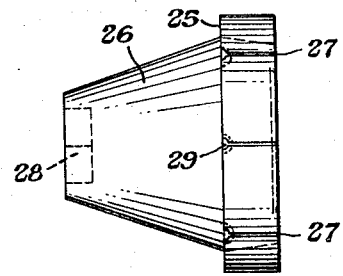
Fig. 2 is a side view of the die member in elevation.

The essential feature of the invention is the extrusion die comprising in combination the die member having the constricted passageways therethrough and the grooves therein, and the discharge member, coaxial with and rotatable with relation to one another with running clearance therebetween, and having the outlets in the discharge member adapted to be alternately brought in register with the constricted passageways and with the grooves in the die member as said die member and discharge member are rotated with relation to one another, which is shown in one typical conformation in the cylindrical barrel of a standard, usually horizontal, extrusion machine in Fig. 1, and in another typical conformation in Fig. 8 of the drawings.

Referring to Fig. 1 of the drawing the extrusion die of the present invention comprises in combination the die member 13 and the discharge member 14 as used in the cylindrical barrel 15 of a standard, usually horizontal, extrusion machine 16, and is a coaxial extension of a feed screw 17 of conventional type. Screw 17 usually, but not necessarily, has a root 18 at least half the diameter of barrel 15 and is ordinarily of the compression type, with a diminishing lead on the successive flights of the screw. Typically, the barrel 15 is surrounded by chamber 19 for heating or cooling as required. Advantageously, a mixing torpedo for plastics extruders (not shown) similar to that described in U. S. Patent No. 2,453,088, can be interposed as a coaxial extension of the feed screw 17, between said feed screw and the die member 13, with suitable modification of the end of the mixing torpedo to connect and turn the die member as a coaxial extension thereof, but such mixing torpedo is not required. Beyond die member 13 in the extruder path is discharge member 14. Typically, the discharge member 14 is a plate held in place across the discharge end of the barrel 15 by bolts 20 which may be inserted or withdrawn through bolt holes 21 and tapped sockets 22. Discharge member 14 contains an inlet 23 and a plurality of outlets 24 or orifices which can be of any desired shape, e.g. round or square, but round or tapered drill holes are preferred.

The essential features of the die member employed as a coaxial extension of a feed screw in the barrel of a plastics extruder which is shown in Fig. 1 are shown in greater detail in Figs. 2, 3, 4 and 5, Fig. 5 being an enlarged view of a portion of the face of the die member showing an arrangement of the constricted passageways and the grooves therein. The body of the die member 13 is suitably in the form of a frustrum of a cone of a diameter of from one-half to three-quarters the diameter of the barrel of the extruder, the frustrum matching the diameter of the root 18 of the feed screw 17, tapering outward to a base enough smaller than the diameter of the barrel 15 to allow for a rim 25 enough smaller than the bore of the barrel 15 to leave running clearance of from about 0.010 to 0.020 inch between the rim 25 and the barrel 15 and which rim 25 is enough larger than the base of the cone 26 to provide a plurality of constricted passageways 27, e.g. peripheral slots, in the rim for flow of the plastic material through the die member 13. The die member 13 is rotated by screw 17 by means of a hexagonal stud of a diameter less than that of the root 18 of the screw 17 and forming a slip fit with a corresponding socket 28 in the end of the die member 13. Conversely, the end of the screw 17 may have a hexagonal or square socket forming a slip fit with a corresponding stud on the die member 13 to rotate the die member as the screw is turned. It is advantageous to rotate the die member by a slip fitted stud and socket connection with the screw so that pressure of the advancing plastic maintains the face of the die member parallel against the discharge member 14.

Figure 4:
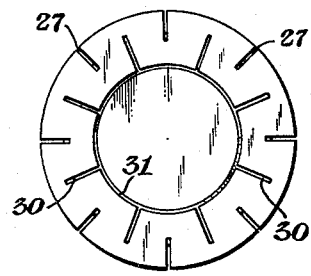
Fig. 4 is an end view of the face of the die member showing the constricted passageways and the grooves therein.
Figure 6:
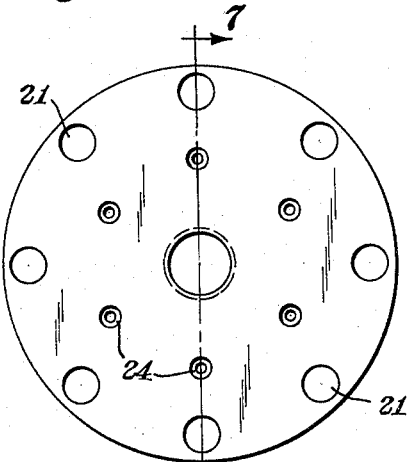
Fig. 6 is an end view of the face of the discharge member.
Figure 7:
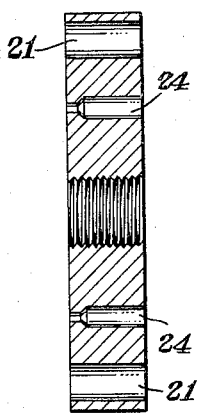
Fig. 7 is a cross-sectional view of the discharge member taken along the lines 7—7 of Fig. 6.
Figure 5:
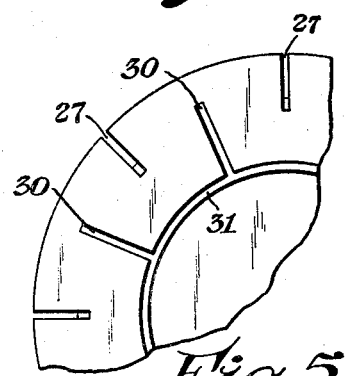
Fig. 5 is an enlarged view of a portion of the face of the die member showing in greater detail the constricted passageways therethrough and the grooves in the face of the die member.

The die member 13 can be a tapered frustrum of a cone to furnish a smooth approach over which plastic material may be forwarded as it leaves the screw 17 or a tapered circumferential shoulder (not shown) can be used to provide a smooth approach over which the plastic material can be forwarded into the constricted passageways 27 in the rim 25 of the die member 13. The constricted passageways 27, can be drill holes or slots and of any cross-sectional configuration, i.e. round, square, oblong, etc., but are preferably peripheral slots equally spaced around the rim 25 of the die member 13 with tapered shoulders 29 leading into the slots to provide a smooth flow of plastic material therein. As shown in Fig. 4, the face of the die member 13 contains a plurality of radially disposed grooves 30 extending outwardly between each of the peripheral slots or constricted passageways 27, but not connecting therewith. The grooves 30 are suitably of a width and depth which is the same as the diameter of the constricted passageways 27 if drill holes, or of their width, if slots. The radially disposed grooves 30 connect with an annular groove 31 in the face of the die member 13 which groove 31 can be of a width and depth of from 0.010 to 0.25 inch or larger. The annular groove 31, shown in Fig. 5, in the face of the die member 13 forms with the discharge member 14 a reservoir or common chamber for feed of a fluid into the radial grooves 30 when the die member 13 and the discharge member 14 are positioned adjacent to one another with running clearance therebetween. The discharge member 14 consists of a plate larger in diameter than the bore of the barrel 15 and held in place across the end of the extruder by bolts 20. The discharge member 14 is provided with a plurality of outlets 24 such as drill holes or openings of other cross-sectional configuration, e.g. square, oblong or hexagonal, although tapered drill holes are preferred. The outlets 24 are preferably a plurality of equally spaced drill holes on a circle having a diameter the same as that of a circle which encompasses both a portion of the constricted passageways 27, such as the bottoms of the peripheral slots, and the outer ends of the radial grooves 30, in the face of the die member 13 and may correspond in number and in spacing to the number and spacing of the constricted passageways 27. The outlets 24 in the discharge member 14, preferably do not correspond in number and in spacing to the number and spacing of the grooves and constricted passageways in the die member 13, in order to prevent pulsing of the flow of the fluid through the outlets. By employing a number and spacing of the outlets different from the number and spacing of the constricted passageways and grooves, only part of the grooves and outlets are in register at the same time and pulsing of the flow of the fluid is prevented. This is particularly advantageous when the fluid is a liquid, e.g. water. The outlets 24 are brought in register with the constricted passageways 27 and alternately in register with the grooves 30 as the die member 13 is rotated with respect to the discharge member 14. The outlets 24 are suitably of a size substantially the same as the width of the constricted passageways 27 in the die member 13 and of a depth in the discharge member 14 corresponding to about their diameter, after which the outlets 24 are advantageously enlarged to a greater diameter as shown in Fig. 7 to facilitate ejecting and cooling of the plastic material through the discharge member 14. The discharge member 14 has an inlet 23, suitably secured in a threaded drill hole centrally located or coaxial with the axis of the extruder 16.

As a specific illustration, a nominal 3-inch plastics extruder had a barrel and screw 4 feet long. The screw was cut and was coaxially shaped to form a 1.5 inch hexagonal stud which formed a slip fit with a corresponding hexagonal socket 28 of a 1.5 inch long die member 13 similar to that shown in Figs. 2, 3, 4 and 5. The cone 26 of the die member had a 22½° slope. The die member 13 had a rim 25, 3 inches in diameter by one-half inch wide by 0.125-inch thick. The rim contained 45 equally spaced peripheral slots 0.035 inch wide by 0.125 inch deep. On its face the die member 13 contained 45 equally spaced radially disposed grooves 0.035 inch wide by 0.125 inch deep and 0.25 inch long extending between the peripheral slots to within 0.09375 inch of the outer edge of the rim. The inner ends of the radially disposed grooves connected with an annular groove 2⅛ inches in diameter by 0.0625 inch wide by 0.0625 inch deep. A center core 2 inches in diameter was flush with the face of the die member 13. The die member 13 had a rim 25, 3 inches in diameter by one-barrel 15 of the extruder 16 and was positioned adjacent to a discharge member 14 held in place across the end of the extruder 16 by bolts 20, and with running clearance between the die member 13 and the discharge member 14. The discharge member 14 was a round plate 0.5 inch thick having a central inlet consisting of a drill hole tapped with 0.25 inch U.S. standard pipe threads, and contained 50 outlets consisting of 0.035-inch diameter drill holes of 0.035-inch deep connecting with 0.125 inch diameter drill holes as shown in Fig. 7. The outlets were equally spaced on a circle having a diameter of 2⅝ inches and were adapted to be alternately brought in register with the peripheral slots and with the radially disposed grooves in the die member 13 as the die member was rotated with respect to the discharge member.

In operation the extruder 16 is heated with steam, hot water, oil, or other heat transfer medium in chamber 19 and the plastic composition is brought to a desired temperature and is advanced and maintained under a continuously applied pressure (by motion of the screw 17 turned by a motor-driven gear, not shown) into the constricted paseageways 27 in the die member 13. A fluid which is immiscible with the plastic composition is fed under pressure via inlet 23 in discharge member 14 and at a temperature above its boiling point at atmospheric pressure, into the grooves 31 and 27 in die member 13, i.e. between the adjacent faces of the die member 13 and the discharge member 14. Such fluid can be a gas or liquid such as nitrogen, propane, water, methyl alcohol or the like, and at a temperature above its normal boiling point and under a pressure sufficient to provide appreciable cooling action, either by expansion or by both expansion and by heat of vaporization, and to eject the plastic material through the outlets 24, upon release of the pressure. In the modification shown in Fig. 1, rotation is to the left since screw 17 is right handed. When the plastic material reaches the constricted passageways 27 in the die member 13 it is advanced into the peripheral slots 27. Examination has shown that continuously applied pressure to the plastic material as the screw 17 and the die member 13 is rotated, results in unique flow of the plastic material into the peripheral slots 27 and out of said slots at the rearward edge of the rim of the die member 13, whereby the constricted passageways are self-cleaning and have little or no tendency to become plugged by pocketing and solidifying of the plastic material therein. Apparently, frictional drag on a lubricating film of the plastic material between the barrel 15 and the rim 25 of the die member 13 causes the plastic to roll within the peripheral slots both axially and radially within the slots. When the die member 13 is rotated the peripheral slots 27 are brought in register with the outlets 24 in the discharge member 14. The plastic material under pressure advances into the outlets 24 and is cut into discrete portions as the die member 13 rotates out of register with the outlets 24. Continued rotation of the die member 13 brings the grooves 30 in the face of die member 13 in register with the outlets 24 in the discharge member 14, whereby the non-reacting fluid which is immiscible with the plastic and under pressure is flowed into the outlets 24 behind the plastic globules and ejects the plastic material from the outlets and cools it to discrete solid particles or beads.

In practice, the 3-inch extruder as modified above with the new extrusion die has been used to make beads of a number of organic plastics such as polystyrene, polyethylene, ethylcellulose and compositions of such polymers, e.g. polystyrene and a volatile organic liquid, polyethylene and a normally gaseous agent or plasticized ethyl cellulose of substantially uniform sizes. In a specific example polystyrene having a molecular weight of about 23,000, a second order transition temperature of about 45° C. and a viscosity characteristic of 15 centipoises (determined as a 30 weight percent solution of the polystyrene in toluene at 25° C.) was fed to the plastics extruder at a rate of 40 pounds per hour. The polystyrene was heated to its melting point and was advanced by the feed screw turning at 61 revolutions per minute into the constricted passageways, i.e. the peripheral slots 27, having a width of 0.035 inch under a continuously applied pressure of 600 p.s.i. gauge pressure and at a temperature of 116° C. Water at a temperature of 109° C. and under a pressure of 200 p.s.i. gauge pressure was fed into inlet 23 in the discharge member 14 at a rate of 350 pounds per hour. The polystyrene and the water were discharged from the extrusion die into the atmosphere. The polystyrene was obtained in the form of beads of substantially uniform size. A representative portion of the polystyrene beads was subjected to a screen analysis and found to consist of beads of sizes as follows:

| U.S. standard screen, mesh size: | Weight percent of beads |
|---|---|
| 12 | 3.5 |
| 16 | 73.9 |
| 18 | 22.6 |
| | 100.0 |

In Fig. 8 of the drawing, the extrusion die comprises in combination a cylindrical die member 34 having a plurality of constricted passageways 35 and a discharge member 36 having a plurality of outlets 37, coaxial with and surrounding the die member and which discharge member 36 is rotatable about the die member 34 and running clearance of from 0.010 to 0.020 inch therebetween. The extrusion die is adapted to be used in combination with a standard, usually horizontal, extrusion machine as an extension of the barrel of the extruder, or it can be used in combination with a plastics pump to advance and maintain a plastic material under continuously applied pressure in the extrusion die. The die member 34 consists of a cylindrical barrel having a plurality of constricted passageways 35, suitably longitudinal slots, through its mid-section into the barrel, and a plurality of longitudinal grooves 38 on its outer surface between and not connecting with the longitudinal slots 35, which grooves extend longitudinally beyond the ends of the slots 35. The ends of the grooves 38 connect with chambers 39 and 39a in the discharge member 36. The die member has an inlet 40 leading to said chamber 39 through the rim of the barrel of the die member 34. Beyond the longitudinal slots and grooves in the midsection of the barrel of the die member 34, the barrel has a tapered circumferential shoulder 41 to furnish a smooth approach for advance of plastic into a smaller diameter extension of the barrel for clean-out or by-passing of the plastic material during start-up in operation. The clean-out end of the die member 34 is provided with a valve, e.g. a plug valve, or a threaded plug 42 as shown which closes outlet 43 when the plug is turned into the threaded end of the die member 34. The feed end of the die member is provided with a flange 44 having suitable bolt holes 45 therein for securing the die member 34 to the discharge end of a plastics extruder or other source of supply and means for advancing plastic into the die member and maintaining it under a continuously applied pressure. Two circumferential grooves 47 and 47a are provided in the outer surface of the die member 34 for the insertion of snap rings to hold discharge member 36 in position. The die member 34 is shown in greater detail in Figs. 9 and 11 of the drawings.

The discharge member 36 consists of a circumferential sleeve having an internal diameter enough larger than the diameter of the die member 34 to provide running clearance of from about 0.010 to 0.020 inch between the two members. This clearance should ordinarily be small enough to prevent appreciable leakage of plastic therethrough. The discharge member 36 is provided with internal grooves 48 and 48a suitably of from $\frac{1}{32}$ to $\frac{1}{8}$ inch deep, which grooves form with the die member 34, the chambers 39 and 39a in the assembled extrusion die shown in Fig. 8. The internal grooves 48 and 48a are suitably of a width sufficient to connect with the ends of grooves 38 in the die member 34 and with the inlet 40 as the discharge member 36 is rotated around the die member 34. Between the internal grooves 48 and 48a in the discharge member 36 there is provided a plurality of outlets 37 coaxial and longitudinal with the axis of the discharge member. Such outlets can be of any cross-sectional configuration such as square, oblong, rectangular, round or triangular, but round or tapered drill holes are advantageously employed. The outlets are suitably of a diameter the same as or substantially the same as the width of the slots 35 in the die member 34. Although outlets of smaller diameter can be used, the outlets should not be appreciably greater in diameter than the width of the slots 35 in order that the cross-sectional area of the outlets be completely filled with plastic as the outlets 37 in the discharge member 36 and the slots 35 in the die member 34 are brought in register with one another when the discharge member 36 is rotated about the die member 34. The outlets 37 in the discharge member 36 can be of any convenient size and cross-sectional configuration, but are advantageously drill holes of from 0.02 to 0.25 inch in diameter and of a depth in the discharge member 36 substantially the same as the diameter, then tapering to a larger diameter to facilitate ejecting or discharge of the plastic material through the outlets. Typically the outlets are tapered drill holes of the kind shown in Fig. 12.

The discharge member 36 surrounds the die member 34 with the constricted passageways, i.e. the longitudinal slots 35, and the external grooves 38, therein adapted to be brought in register with the outlets 37 in the die member 36 as the discharge member 36 is rotated. The discharge member 36 is held in position by snap rings 49 and 49a fitted in annular grooves 47 and 47a in die member 34.

Between snap ring 49a and the end of discharge member 36 there is placed a rotary seal 50a of the conventional type. Another rotary seal 50 is placed adjacent to the other end of the die member 36 and is held in position by ring 51 and snap ring 49.

The discharge member 36 is rotated by means of a gear or sprocket 52 secured to ring 53 by means of bolts 54 and rotates on a bearing 55. A flexible coupling 56 connects ring 53 and sprocket 52 secured thereto with the discharge member 36 to rotate the same when the sprocket 52 is set in motion by a motor-driven sprocket and chain (not shown).

In operation the extrusion die shown in Fig. 8 is connected to a source of supply of a plastic material, e.g. a plastics extruder or a plastics pump. Molten or heat-softened plastic, e.g. polystyrene or a composition comprising polystyrene, in a flowable condition is advanced into the barrel of the die member 34 under a continuously applied pressure and is pressed into the constricted passageways, i.e. the longitudinal slots 35 in the midsection of said member. In starting up the apparatus the plastic is usually by-passed and allowed to flow or extrude through outlet 43 by backing-off plug 42 sufficient to open the outlet to clean the bore of the barrel. A gas or liquid fluid which is non-reacting and immiscible with the plastic, e.g. nitrogen, propane, methyl alcohol or water, is fed under pressure and at a temperature above its boiling point at atmospheric pressure via inlet 40 into chamber 39 and via grooves 38 into chamber 39a.

The discharge member 36 is set in motion by a motor-driven sprocket and chain (not illustrated) in the conventional manner. As the discharge member rotates the outlets 37 in the discharge member 36 are brought in register with the longitudinal slots 35 in the barrel of the die member 34. The plastic under continuously applied pressure within the barrel and slots of the die member advances into the outlets 37 and is cut into discrete portions or globules as the discharge member 36 rotates to move the outlets 37 out of register with the slots 35. Continued rotation of the discharge member 36 brings the outlets 37 in register with the longitudinal grooves 38 on the outer surface of the mid-section of the die member 34, whereby the fluid under pressure which is non-reacting and immiscible with the plastic, preferably superheated water under pressure, is flowed into the outlets 37 behind the plastic globules and simultaneously ejects and cools the plastic globule to the solid state in the form of beads.

The extrusion die of the invention is advantageously employed to form beads from thermoplastic substances or organic plastics such as cellulose esters, cellulose ethers, alkenyl aromatic resins, the other vinyl and acrylic polymers, vinylidene chloride copolymers, and normally solid thermoplastic compositions comprising such thermoplastic substances, i.e. organic plastics having a small proportion of plasticizers, pigments, dyes, volatile organic compounds and the like, incorporated therewith.

We claim:

1. In an extruder in combination with means for advancing a plastic feed along a cylindrical barrel and maintaining it under pressure in an extrusion zone: an extrusion die comprising in combination a die member having a plurality of constricted passageways therethrough and a discharge member having a plurality of adjacent outlets, said die member and said discharging member being rotatable with respect to one another, with running clearance therebetween, to bring said constricted passageways in register with said outlets, said die member having on its discharge surface a plurality of grooves at least one end of which grooves connects with a common chamber between adjacent surfaces of said die member and said discharging member, and with other sections of said grooves which are brought in register with said outlets in said discharging member between register of said constricted passageways in said die member with said outlets in the discharging member as the members rotate with respect to one another, and an inlet in said discharging member adapted for feed of a fluid to said common chamber and the grooves between said die member and said discharging member.

2. In an extruder in combination with means for advancing a plastic feed along a cylindrical barrel and maintaining it under pressure in an extrusion zone: a cylindrical die member surrounding the extrusion zone, coaxial and continuous with the cylindrical barrel, having a plurality of evenly spaced constricted passageways consisting of slots therethrough, and a cylindrical discharging head, coaxial with and surrounding the cylindrical die, rotatable therearound with running clearance therebetween, and having a plurality of uniform evenly spaced outlets therethrough, said cylindrical die member having on its peripheral surface a plurality of evenly spaced longitudinal grooves of constant radius between said slots, the ends of which longitudinal grooves connect with common chambers in said cylindrical discharging head, and the mid-sections of said grooves being brought in register with the outlets in the discharging head between register of the slots in the cylindrical die member with the outlets in the discharging head as the members rotate with respect to one another, and an inlet in said die member adapted for feed of a fluid to at least one of said common chambers in the discharging head and the grooves in the cylindrical die member.

3. In an extruder in combination with a screw for advancing plastic feed along a cylindrical barrel and maintaining it under pressure in an extrusion zone: a cylindrical die member beyond the screw, coaxial and continuous therewith, rotatable within the barrel with running clearance therebetween and between a circular discharging head, said cylindrical die member having a plurality of evenly spaced constricted peripheral passageways therethrough and on its surface adjacent to the discharging head a plurality of radially disposed grooves of constant radius between said peripheral passageways, the inner ends of which grooves connect with a common chamber in said cylindrical die member, and between adjacent surfaces of said die member and said discharging head and the outer ends of said grooves being brought in register with the outlets in the discharging head between register of the peripheral passageways in the die member with said outlets in the discharging head as the die member rotates, and a central inlet in said discharging head adapted for feed of a fluid to said common chamber and the grooves through the running clearance between said die member and said discharging head.

References Cited in the file of this patent
UNITED STATES PATENTS

| | | |
|---|---|---|
| 2,186,415 | Haworth | Jan. 9, 1940 |
| 2,862,243 | Farr et al. | Dec. 2, 1958 |

UNITED STATES PATENT OFFICE

CERTIFICATE OF CORRECTION

Patent No. 2,958,099                           November 1, 1960

Douglas S. Chisholm et al.

It is hereby certified that error appears in the above numbered patent requiring correction and that the said Letters Patent should read as corrected below.

Column 5, line 22, strike out "had a rim 25, 3 inches in diameter by one-" and insert instead -- was slip-fitted to the feed screw 17 in the --.

Signed and sealed this 3rd day of October 1961.

(SEAL)
Attest:

ERNEST W. SWIDER                           DAVID L. LADD
Attesting Officer                             Commissioner of Patents

USCOMM-DC